(12) United States Patent
Jau et al.

(10) Patent No.: US 9,304,562 B2
(45) Date of Patent: Apr. 5, 2016

(54) SERVER RACK SYSTEM AND POWER MANAGEMENT METHOD APPLICABLE THERETO

(75) Inventors: Maw-Zan Jau, Taipei (TW); Wei-Yi Chu, Taipei (TW); Ting-Chen Ko, Taoyuan County (TW); Li-Ching Chi, New Taipei (TW); Wei-Kai Chao, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 4 days.

(21) Appl. No.: 13/571,728

(22) Filed: Aug. 10, 2012

(65) Prior Publication Data

US 2013/0179718 A1    Jul. 11, 2013

(30) Foreign Application Priority Data

Jan. 10, 2012    (TW) .............................. 101100984 A

(51) Int. Cl.
  *G06F 1/26* (2006.01)
  *G06F 1/30* (2006.01)
  *G06F 1/32* (2006.01)

(52) U.S. Cl.
  CPC ................ *G06F 1/263* (2013.01); *G06F 1/305* (2013.01); *G06F 1/3287* (2013.01); *Y02B 60/1282* (2013.01)

(58) Field of Classification Search
  CPC . G06F 1/263; G06F 11/1417; G06F 11/2015; G06F 1/28; G06F 1/30; G06F 1/305
  USPC .......................................................... 714/14
  See application file for complete search history.

(56) References Cited

U.S. PATENT DOCUMENTS

| | | | |
|---|---|---|---|
| 8,024,606 B2 * | 9/2011 | Bolan et al. ..................... 714/22 |
| 8,156,490 B2 * | 4/2012 | Bozek et al. ...................... 718/1 |
| 2004/0228087 A1 | 11/2004 | Coglitore | |
| 2008/0086659 A1 * | 4/2008 | Ishikawa et al. ................ 714/22 |
| 2010/0169031 A1 * | 7/2010 | Dishman et al. ................ 702/60 |
| 2011/0302432 A1 * | 12/2011 | Harris et al. .................. 713/320 |
| 2012/0116590 A1 * | 5/2012 | Florez-Larrahondo et al. ............................. 700/275 |
| 2013/0111243 A1 * | 5/2013 | Barnette et al. ............... 713/323 |

FOREIGN PATENT DOCUMENTS

| | | |
|---|---|---|
| CN | 101937264 | 1/2011 |
| CN | 101946224 | 1/2011 |

(Continued)

OTHER PUBLICATIONS

Office Action mailed Jun. 17, 2014; in corresponding Taiwanese patent application No. 101100984.

(Continued)

*Primary Examiner* — Jigar Patel
(74) *Attorney, Agent, or Firm* — Novak Druce Connolly Bove + Quigg LLP

(57) ABSTRACT

A server rack system including a plurality of power supply units, a monitoring circuit, a rack management controller (RMC), and a plurality of server nodes is provided. The monitoring circuit is for monitoring the power supply units. The RMC is for monitoring the power supply units. When the monitoring circuit and/or the RMC finds that at least one of the power supply units failed to output a normal voltage, an operation status of the server nodes is lowered or at least one of the server nodes is forcibly shut down.

19 Claims, 3 Drawing Sheets

(56) References Cited

FOREIGN PATENT DOCUMENTS

| TW | 200510994 | 3/2005 |
|---|---|---|
| TW | 200945014 | 11/2009 |
| TW | 201018063 | 5/2010 |
| TW | 201111949 | 4/2011 |

OTHER PUBLICATIONS

English abstract for TW200945014; published on Nov. 1, 2009 and retrieved on Sep. 17, 2014.

English abstract for TW201018063 ; published on May 1, 2010 and retrieved on Sep. 17, 2014.

English abstract for TW201111949; published on Apr. 1, 2011 and retrieved on Sep. 17, 2014.

English abstract for TW200510994; published on Mar. 16, 2005 and retrieved on Sep. 17, 2014.

First Office Action mailed on Feb. 2, 2015 in Chinese Application No. 201210021421.3. (11 pages).

* cited by examiner

SERVER RACK SYSTEM AND POWER MANAGEMENT METHOD APPLICABLE THERETO

This application claims the benefit of Taiwan application Serial No. 101100984, filed Jan. 10, 2012, the subject matter of which is incorporated herein by reference.

BACKGROUND

1. Technical Field

The disclosure relates in general to a server rack system and a power management method applicable thereto.

2. Description of the Related Art

Blade server has been widely used. A plurality of blade servers assembled in a rack system is referred as a rack management controller (RMC) for increasing the convenience of operation.

The blade server of a server rack system may be regarded as a computer. In other words, each blade server installs peripheral devices such as a power supply unit and a dissipation device in addition to core circuits (such as a CPU, a motherboard, a random access memory and a hard disc).

When AC-grid is unstable or the internal power supply unit of the server rack system breaks down, operations of the servers would become unstable (such as crash), or the servers may even be forcibly shut down, and data stored in the server may even be damaged.

The disclosure provides a server rack system and a power management method. Thus, when AC-grid is unstable or internal power supply units of the server rack system breaks down, the servers are operated in a low efficiency state to maintain normal operation of the server rack system, or some of the servers are shut down to maintain the normal operation of other servers.

SUMMARY

The disclosure is directed to a server rack system and a power management method applicable thereto, for lowering an operation status (to reduce the power consumption) of server nodes or forcibly shutting down the server nodes when power supply is unstable or when power supply units break down.

According to one embodiment of the present disclosure, a server rack system including a plurality of power supply units, a monitoring circuit, a rack management controller (RMC), and a plurality of server nodes is provided. The monitoring circuit is for monitoring the power supply units. The RMC is for monitoring the power supply units. When the monitoring circuit and/or the RMC finds that at least one of the power supply units not outputting a normal voltage, an operation status of the server nodes is lowered or at least one of the server nodes is forcibly shut down.

According to one alternate embodiment of the present disclosure, a power management method applicable to a server rack system is provided. The server rack system includes a monitoring circuit, a RMC and a plurality of server nodes. The power management method includes the following steps. If the monitoring circuit finds that a first quantity of at least one power supply not outputting a normal voltage is over a first threshold, then an operation status of the server nodes is lowered or at least one of the server nodes is forcibly shut down in response to a monitoring result of the monitoring circuit. If the monitoring circuit finds that the first quantity of at least one power supply not outputting the normal voltage is not over the first threshold, then the RMC determines whether a second quantity of the power supply units not outputting a normal voltage is over a second threshold. If the RMC determines that the second quantity of at least one power supply not outputting the normal voltage is over the second threshold, then in response to a judgment result of the RMC, the operation status of the server nodes is lowered or at least one of the server nodes is forcibly shut down.

The above and other contents of the disclosure will become better understood with regard to the following detailed description of the preferred but non-limiting embodiment (s). The following description is made with reference to the accompanying drawings.

DETAILED DESCRIPTION OF THE DISCLOSURE

Figure 1:
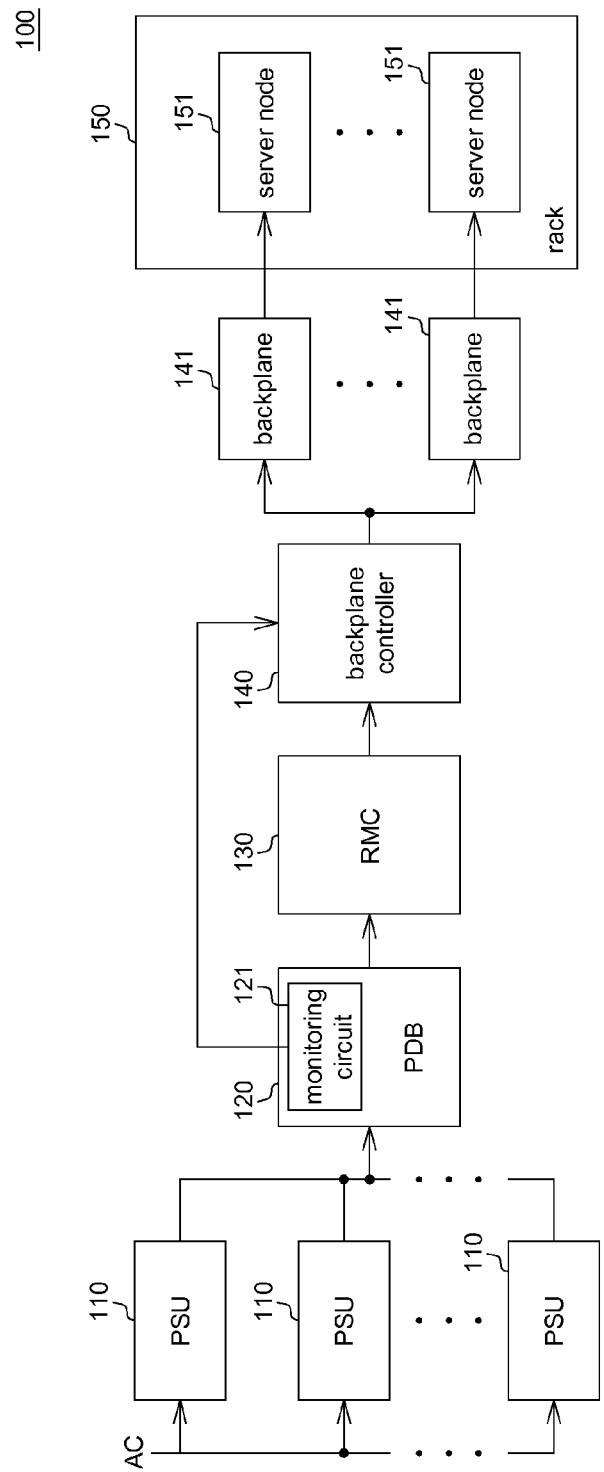
FIG. 1 shows a block diagram of a server rack system according to one embodiment of the disclosure.

Referring to FIG. 1, a block diagram of a server rack system according to one embodiment of the disclosure is shown. The server rack system 100 according to the embodiment of the disclosure includes: a plurality of power supply units (PSU) 110, a power distribution board (PDB) 120, a rack management controller (RMC) 130, a backplane controller 140, a plurality of backplanes 141 and a rack 150. The PDB 120 has a monitoring circuit 121. The rack 150 includes a plurality of server nodes 151. The server nodes 151 slides into the rack 150 and is mounted on the backplanes 141. In the disclosure, the server node 151 such as includes: a central processing unit (CPU), north and south bridges, an operation system, and so on. Theoretically, a server node 151 refers to an independent operating node.

The power supply unit 110 may be realized by an alternate current (AC)/direct current (DC) power supply unit. In the present embodiment, the power supply unit 110 converts an input power AC into a voltage applicable to the rack 150. The input power AC may be realized by such as an AC-grid.

The PDB 120 receives the output voltage converted by the power supply units 110 for power supply distribution. The monitoring circuit 121 of the PDB 120 may monitor the operation status of the power supply units 110 in a real-time manner. If the monitoring circuit 121 finds that the quantity of the power supply units 110 failed to output a normal voltage is over a threshold, then the monitoring circuit 121 outputs an instruction signal to the backplane controller 140 for adjusting the operation status of all or some of the server nodes 151 from a normal operation status to a low loading operation status, so as to reduce the power consumption of the server nodes (illustratively but not restrictively, to lower operation frequency of the CPU of the server nodes 151), or to forcibly shut down at least one server node 151.

The details are disclosed below. In the disclosure, the reasons why the power supply units 110 fail to output the normal voltage are such as: (1) the input power AC is unstable; (2) the power supply units 110 break down.

The RMC 130 is coupled to the PDB 120. The RMC 130 reads the state signals of the power supply units 110. If the RMC 130 determines that there are still too many the power supply units 110 which fail to output the normal voltage or even gets worse, then the RMC 130 sets the backplane controller 140 for adjusting the operation status of all or some of the server nodes 151 from a normal operation status to a low loading operation status or for forcibly shutting down at least one server node 151.

The backplane controller 140 controls the backplanes 141. As disclosed above, if the power supply units 110 fail to supply the normal voltage, then the monitoring circuit 121 and/or the RMC 130 notices the backplane controller 140, which controls the backplanes 141 to adjust the operation status of all or some of the server nodes 151 from a normal operation status to a low loading operation status or to forcibly shut down at least one server node 151. In general, one backplane 141 corresponds to one server node.

Figure 2:
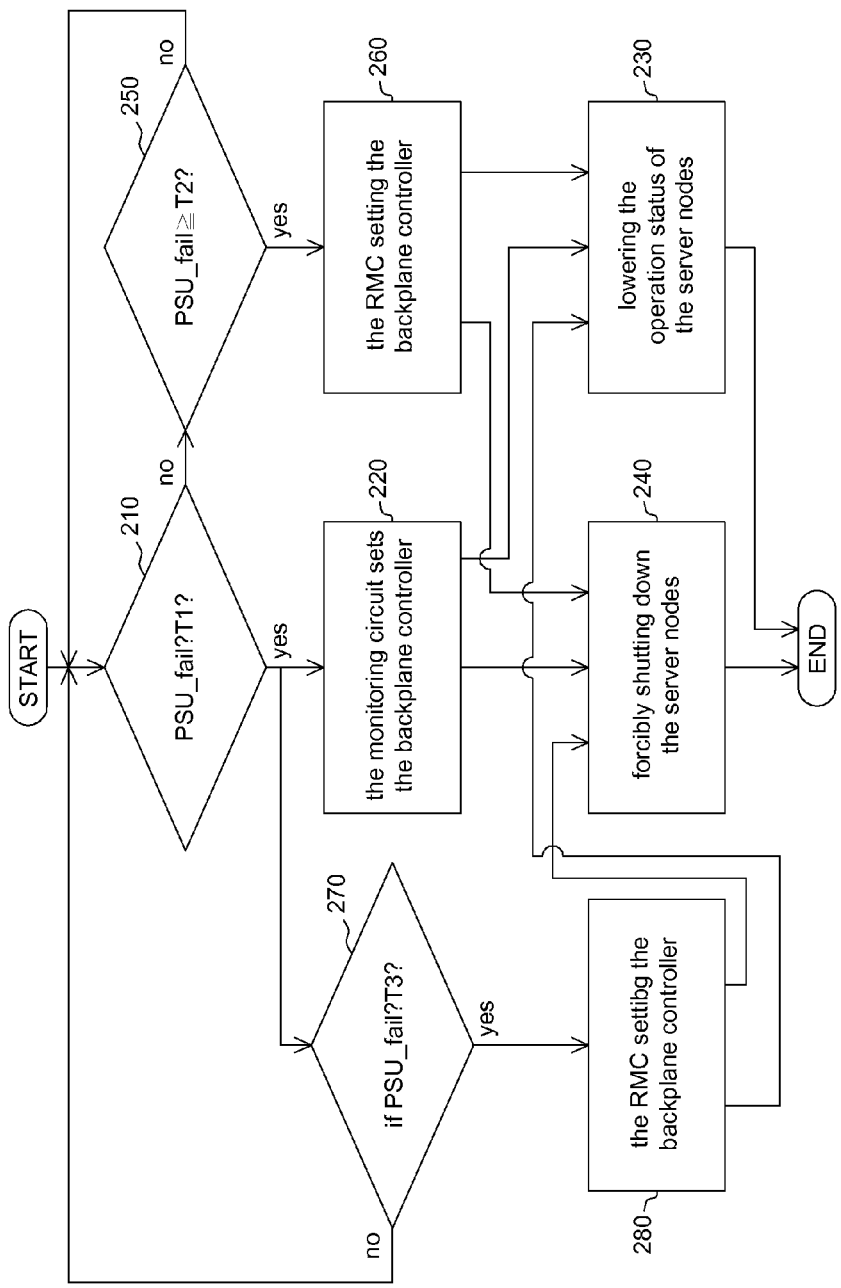
FIG. 2 shows a flowchart of a power management method of the server rack system of FIG. 1.

Referring to FIG. 2, a flowchart of a power management method of the server rack system of FIG. 1 is shown. As indicated in step 210, the monitoring circuit 121 finds that the quantity of the power supply units 110 which fail to output the normal voltage is over a threshold (PSU_fail≥T1), and the monitoring circuit 121 sets the backplane controller (step 220). As indicated in FIG. 2, the designation PSU_fail denotes the quantity of the power supply units 110 which fails to output the normal voltage. The threshold T1 may be set according to actual needs/experience. For example, if the server rack system is light loading, then the threshold T1 may be set as a higher level. That is, the server rack system with light loading may allow more failed power supply units which fail to output the normal voltage, because the light-loading server rack system is still capable of maintaining a normal operation under such circumstances. Conversely, if the server rack system is heavy loading, then the threshold T1 may be set as a lower level. That is, the heavy-loading server rack system does not allow a large number of failed power supply units which fail to output the normal voltage, because the entire server rack system in heavy loading may be forcibly shut down.

As indicated in step 220, the monitoring circuit sets the backplane controller. For example, the monitoring circuit outputs a notice signal to the backplane controller. In response to the notice signal, the backplane controller sets jumpers. For example, the monitoring circuit outputs a notice signal to the backplane controller for lowering a signal line on the backplane controller. In response to the setting of jumpers, the backplanes 141 controls the server nodes. For example, the backplanes 141 lowers the operation status of all or some of the server nodes 151 (for example, the operation frequency of the CPU is lowered) as indicated in step 230. Alternatively, in response to the setting of jumpers, the backplanes 141 forcibly shuts down at least one server node 151 as indicated in step 240.

As indicated in step 210, if the monitoring circuit 121 finds that the quantity of the failed power supply units 110 failed to output the normal voltage (PSU_fail) is not over a threshold T1, then the rack management controller (RMC) determines whether the quantity (PSU_fail) of the failed power supply units 110 failed to output the normal voltage is over a threshold T2 as indicated in step 250. The setting of the threshold T2 may be related to the loading state of the server rack system. The threshold T2 may be, for example, higher than or equal to the threshold T1. If the judgment result in step 250 is negative, then this indicates that meanwhile power supply from the power supply units suffice to keep normal operation of the server rack system 100, and the process returns to step 210. Conversely, if the judgment result in step 250 is positive, then this indicates that the RMC determines that the quantity of the failed power supply units failed to output the normal voltage may become even worse (i.e. there may be more failed power supply units), and the process proceeds to step 260.

As indicated in step 260, the RMC sets the backplane controller. For example, the RMC sets the backplane controller without using a jumper. The RMC sends a signal to an integrated circuit (IC) disposed on the backplane controller, so that setting value of the IC is changed and relevant backplanes perform corresponding operations. Similarly, after the RMC sets the backplane controller (step 260), the operation status of all or some of the server nodes are lowered (step 230) or at least one server node is forcibly shutdown (step 240).

The purpose of steps 250~260 is as follows. Another threshold is set. If the monitoring circuit does not detect any failed power supply unit, then whether there is failed power supply units failed to output the normal voltage is monitored/determined by the RMC, for lowering the operation status of the server nodes or forcibly shutting down the server nodes. In response to the judgment result of the RMC, the degree of lowering the operation frequency of the server nodes and/or how many the server nodes have to be forcibly shut down are determined by the designer according to actual needs/experience.

As indicated in step 210, if the monitoring circuit determines that the quantity of the failed power supply units 110 is over a threshold (i.e. (determines whether PSU_fail≥T1), then the RMC determines whether the quantity of the failed power supply units 110 is over a threshold T3 (i.e.

determines whether PSU_fail≥T3) as indicated in step 270. The setting of the threshold T3 may also be related to the loading state of the server rack system. The threshold T3 may be, for example, higher than or equal to the threshold T1 or the threshold T2.

The purpose of step 270 is as follows. When the situation that the failed power supply units is getting worse, steps 270~280 are to lower the operation status of the server nodes or to forcibly shut down more server nodes.

The above embodiments are used in single-input power system. The server rack system of another embodiment of the disclosure may be used in dual-input power system or multi-input power system.

Figure 3:
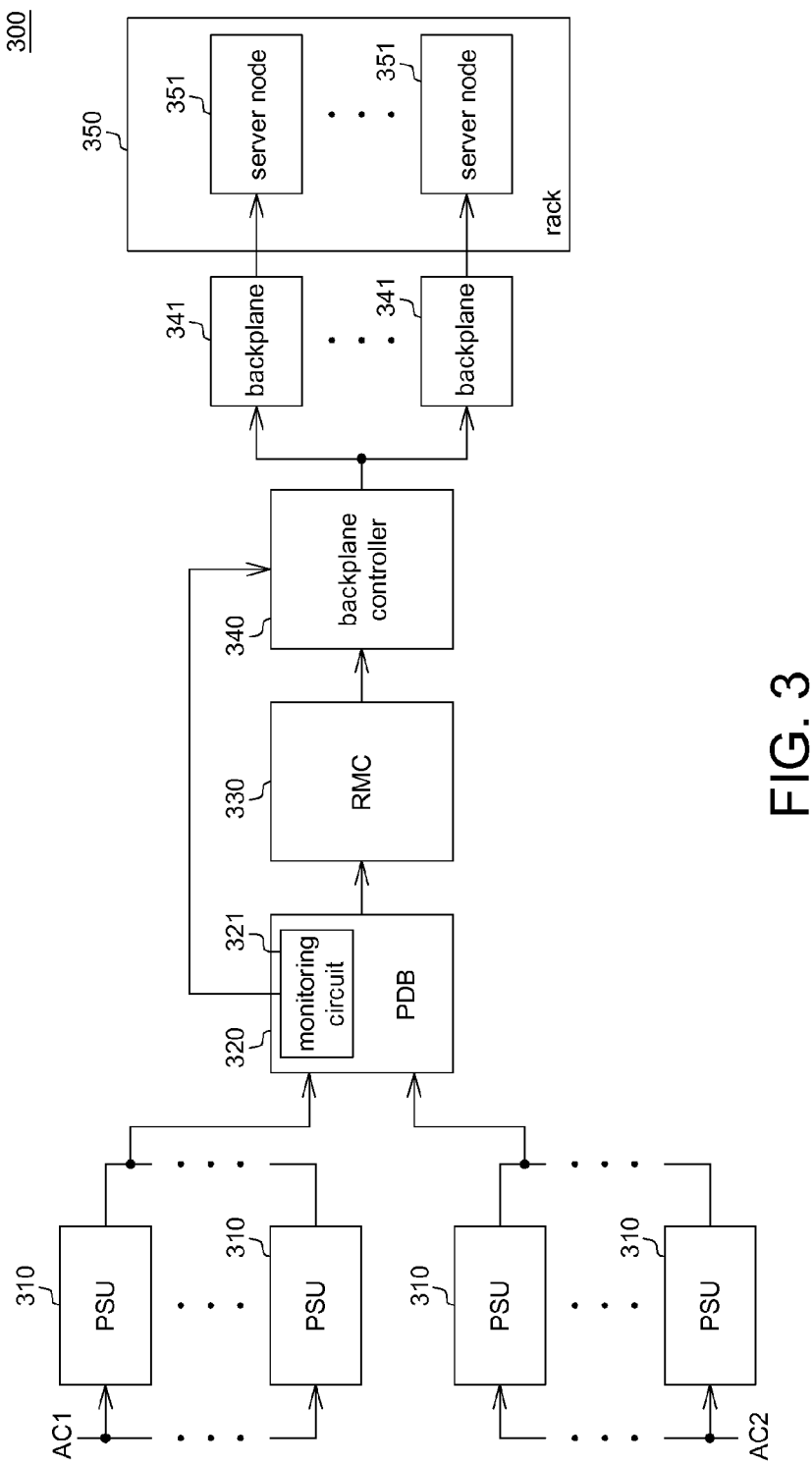
FIG. 3 shows a block diagram of a server rack system according to another embodiment of the disclosure.

FIG. 3 shows a functional block diagram of a server rack system 300 according to another embodiment of the disclosure. The server rack system 300 includes: a plurality of power supply units 310, a PDB 320, an RMC 330, a backplane controller 340, a plurality of backplanes 341 and a rack 350. The PDB 320 has a monitoring circuit 321. The rack 350 includes a plurality of server nodes 351.

Some of the power supply units 310 receive a first input power AC1, and others receive a second input power AC2. The first input power AC1 may be an AC-grid, and the second input power AC2 may be a power supply of other type (such as solar energy or cogeneration).

The operation principles of FIG. 3 are identical or similar to that of FIG. 1, and are not repeated here.

As disclosed in the above two embodiments of the disclosure, if it is detected that the quantity of the failed power supply units which fail to output the normal voltage is over a threshold, then the operation frequency of the server nodes is lowered or the server nodes are forcibly shut down. Thus, the entire server rack system will not be forcibly shut down.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A server rack system, comprising:
    a plurality of power supply units;
    a monitoring circuit for monitoring the plurality of power supply units;
    a rack management controller (RMC) for monitoring the plurality of power supply units;
    a plurality of server nodes; and
    a backplane controller communicatively coupled to the monitoring circuit, the RMC, and the plurality of server nodes;
    wherein the backplane controller is configured for lowering an operation status of at least one of the server nodes or forcibly shutting down one of the server nodes, in response to a command from the monitoring circuit or the RMC,
    wherein the monitoring circuit is configured to detect whether a quantity of power supply units that fails to output a normal voltage is over a first threshold, and
    wherein the RMC is configured to detect whether the quantity is over a second threshold.

2. The server rack system according to claim 1, wherein,
    if the first quantity is not over the first threshold, the RMC determines whether a second quantity of the power supply units failed to output the normal voltage is over a second threshold; and
    if the RMC determines that the second quantity is over the second threshold, then the RMC sets the backplane controller, which controls the backplanes to lower the operation status of the server nodes or to forcibly shut down at least one of the server nodes.

3. The server rack system according to claim 2, further comprising:
    if the first quantity is over the first threshold, the RMC determines whether a third quantity of the power supply units failed to output the normal voltage is over a third threshold; and
    if the third quantity is over the third threshold, then the RMC sets the backplane controller, which controls the backplanes to lower the operation status of the server nodes or to forcibly shut down at least one of the server nodes.

4. The server rack system according to claim 3, wherein, setting of the first threshold and the second threshold is related to a loading state of the server rack system.

5. The server rack system according to claim 4, wherein, setting of the third threshold is related to a loading state of the server rack system.

6. A power management method applicable to a server rack system including a monitoring circuit, an RMC, and a plurality of server nodes, the power management method including:
    determining, via the monitoring circuit, that a first quantity of the plurality of power supplies failing to output a normal voltage is over a first threshold;
    in response to determining that the first quantity is over the first threshold, lowering an operation status of the server nodes or forcibly shutting down at least one of the plurality of server nodes, or in response to determining that the first quantity is not over the first threshold,
    determining, via the RMC, that a second quantity of the plurality of power supply units failing to output the normal voltage is over a second threshold; and
    in response to determining that the second quantity is over the second threshold, lowering the operation status of the server nodes or forcibly shutting down at least one of the server nodes.

7. The power management method applicable to the server rack system according to claim 6, wherein,
    if the monitoring circuit finds that the first quantity of at least one power supply failed to output the normal voltage is over the first threshold, then the monitoring circuit sets a backplane controller; and
    the backplane controller controls a plurality of backplanes to lower the operation status of the server nodes or to forcibly shut down at least one of the server nodes.

8. The power management method applicable to the server rack system according to claim 7, wherein, the monitoring circuit sends a notice signal to the backplane controller for setting at least one jumper of the backplane controller.

9. The power management method applicable to the server rack system according to claim 6, wherein,
    if the RMC determines that the second quantity of at least one power supply failed to output the normal voltage is over the second threshold, then the RMC sets a backplane controller; and
    the backplane controller controls a plurality of backplanes to lower the operation status of the server nodes or to forcibly shut down at least one of the server nodes.

10. The power management method applicable to the server rack system according to claim 6, further comprising:
    determining by the RMC whether a third quantity of the power supply units failed to output the normal voltage is over a third threshold if the monitoring circuit finds that the first quantity of at least one power supply failed to output the normal voltage is over the first threshold; and
    lowering the operation status of the server nodes or forcibly shutting down at least one of the server nodes in response to the judgment result of the RMC if the RMC determines that the third quantity of the power supply units failed to output the normal voltage is over the third threshold.

11. The power management method applicable to the server rack system according to claim 10, wherein,
    if the RMC determines that the third quantity of the power supply units failed to output the normal voltage is over the third threshold, then the RMC sets a backplane controller; and
    the backplane controller controls a plurality of backplanes to lower the operation status of the server nodes or to forcibly shut down at least one of the server nodes.

12. The power management method applicable to the server rack system according to claim 6, wherein, setting of the first threshold and the second threshold is related to a loading state of the server rack system.

13. The power management method applicable to the server rack system according to claim 10, wherein, setting of the third threshold is related to a loading state of the server rack system.

14. A power management method applicable to a server rack system including a monitoring circuit, an RMC, and a plurality of server nodes, the power management method including:
    determining, via the monitoring circuit, that a first quantity of the plurality of power supplies failing to output a normal voltage is over a first threshold;
    in response to determining that the first quantity is over the first threshold, lowering an operation status of the server nodes or forcibly shutting down at least one of the plurality of server nodes, or in response to determining that the first quantity is not over the first threshold, determining, via the RMC, that a second quantity of the plurality of power supply units failing to output the normal voltage is over a second threshold; and in response to determining that the second quantity is over the second threshold, lowering the operation status of the server nodes or forcibly shutting down at least one of the server nodes, wherein, setting of the first threshold and the second threshold is related to a loading state of the server rack system.

15. The power management method applicable to the server rack system according to claim 14, wherein, if the monitoring circuit finds that the first quantity of at least one power supply failed to output the normal voltage is over the first threshold, then the monitoring circuit sets a backplane controller; and the backplane controller controls a plurality of backplanes to lower the operation status of the server nodes or to forcibly shut down at least one of the server nodes.

16. The power management method applicable to the server rack system according to claim 15, wherein, the monitoring circuit sends a notice signal to the backplane controller for setting at least one jumper of the backplane controller.

17. The power management method applicable to the server rack system according to claim 14, wherein, if the RMC determines that the second quantity of at least one power supply failed to output the normal voltage is over the second threshold, then the RMC sets a backplane controller; and the backplane controller controls a plurality of backplanes to lower the operation status of the server nodes or to forcibly shut down at least one of the server nodes.

18. The power management method applicable to the server rack system according to claim 14, further comprising:

determining by the RMC whether a third quantity of the power supply units failed to output the normal voltage is over a third threshold if the monitoring circuit finds that the first quantity of at least one power supply failed to output the normal voltage is over the first threshold; and lowering the operation status of the server nodes or forcibly shutting down at least one of the server nodes in response to the judgment result of the RMC if the RMC determines that the third quantity of the power supply units failed to output the normal voltage is over the third threshold.

19. The power management method applicable to the server rack system according to claim 18, wherein, if the RMC determines that the third quantity of the power supply units failed to output the normal voltage is over the third threshold, then the RMC sets a backplane controller; and the backplane controller controls a plurality of backplanes to lower the operation status of the server nodes or to forcibly shut down at least one of the server nodes.

* * * * *